US012670816B2

(12) United States Patent
Wu

(10) Patent No.: US 12,670,816 B2
(45) Date of Patent: Jun. 30, 2026

(54) COMPOSITE LABEL

(71) Applicant: Changchong Wu, Zhejiang (CN)

(72) Inventor: Changchong Wu, Zhejiang (CN)

( * ) Notice: Subject to any disclaimer, the term of this patent is extended or adjusted under 35 U.S.C. 154(b) by 0 days.

(21) Appl. No.: 19/319,879

(22) Filed: Sep. 5, 2025

(65) Prior Publication Data

US 2026/0087949 A1 Mar. 26, 2026

(30) Foreign Application Priority Data

Sep. 25, 2024 (CN) ......................... 202422343621.1

(51) Int. Cl.
*G09F 3/14* (2006.01)

(52) U.S. Cl.
CPC ..................................... *G09F 3/14* (2013.01)

(58) Field of Classification Search
CPC ......................................................... G09F 3/14
See application file for complete search history.

(56) References Cited

U.S. PATENT DOCUMENTS 2,214,823 A * 9/1940 Simon ....................... G09F 3/14 292/307 R
RE27,357 E * 5/1972 Merser ...................... G09F 3/14 24/16 PB
3,777,378 A * 12/1973 Sant'Anselmo .......... G09F 3/14 40/27
3,834,748 A * 9/1974 Lonnee ..................... G09F 3/14 292/320
4,038,725 A * 8/1977 Keefe ....................... G09F 3/14 292/322
4,093,288 A * 6/1978 Suzuki ...................... G09F 3/14 292/321
2006/0119111 A1* 6/2006 De Lima Castro .......................... B65D 63/1054 292/316
2006/0202833 A1* 9/2006 Norman ............. G08B 13/2434 340/572.9
2020/0160681 A1* 5/2020 Kwon ................ G08B 13/2434
2021/0049884 A1* 2/2021 Siao ........................ G09F 3/037

* cited by examiner

*Primary Examiner* — Gary C Hoge
(74) *Attorney, Agent, or Firm* — Hawaii Patent Services; Nathaniel K. Fedde; Kenton N. Fedde

(57) ABSTRACT

The present disclosure relates to a composite label, comprising a labeling plate and a connecting plate. The labeling plate is fixedly connected to the connecting plate; the connecting plate is provided with a connecting block to secure a binding strip, and the top is equipped with an encapsulation tube and internal components; the through holes of the components form a passage for the binding strip to traverse, allowing the free end to pass through and engage. Through modular design, the labeling plate and the fixing mechanism can be flexibly combined, solving the issue of traditional labels being restricted to specific styles and sizes, and offering the advantages of flexible combination and wide applicability.

11 Claims, 16 Drawing Sheets

COMPOSITE LABEL

CROSS-REFERENCE TO RELATED APPLICATIONS

This application claims priority to Chinese Patent Application No. 202422343621.1, titled "Composite Label," filed on Sep. 25, 2024, the content of which, including the amendments thereof, is incorporated herein by reference in its entirety.

TECHNICAL FIELD

The present disclosure relates to the field of label technology, particularly to a composite label.

BACKGROUND

A label is a brief text, symbol, or graphic used to identify, classify, or describe a specific object, information, or product. They are typically attached to objects. In the existing field of label technology, most commercially available label products adopt an integrated design, meaning the style and size specifications of each label are directly linked, fixed, and unchangeable.

While this design approach meets basic identification needs to some extent, its limitations become increasingly apparent as product varieties grow and consumer demands diversify. The binding of style and size specifications in integrated labels forces merchants to prepare a plurality of label styles for different packaging or product sizes. This not only increases inventory costs and management complexity but also restricts the flexibility and applicability of labels. Additionally, integrated labels face numerous constraints during manufacturing. Since each style corresponds to a fixed size specification, manufacturers must customize molds or adjust production lines according to customer demands to accommodate different styles. This prolongs production cycles, raises costs, reduces efficiency, and struggles to meet rapidly changing market demands. Hence, a composite label is proposed.

SUMMARY

An object of the present disclosure is to address the drawbacks of existing integrated labels, where the binding of style and size specifications forces merchants to prepare a plurality of label styles for different packaging or product sizes, increasing inventory costs and management complexity while limiting label flexibility and applicability. Moreover, integrated labels face manufacturing constraints, as each style's fixed size specification requires customized molds or production line adjustments, prolonging cycles, raising costs, reducing efficiency, and failing to meet fast-changing market demands. To overcome these issues, a composite label is proposed.

To achieve the above object, the following technical solutions are adopted:

A composite label comprises an interlocking fixing mechanism. The interlocking fixing mechanism comprises a connecting plate. A top of the connecting plate is fixedly connected to an encapsulation tube, one side of the connecting plate is fixedly connected to two connecting blocks, and sides of the two connecting blocks facing each other are fixedly connected to a same binding strip.

In a feasible design, the encapsulation tube is internally provided with an iron member for engaging the binding strip.

In a feasible design, the center of a top of the iron member is provided with a second through hole penetrating therethrough, and a circumferential outer wall of the iron member is fixedly connected to a plurality of limiting blocks to prevent the iron member from moving.

In a feasible design, one end of the binding strip is fixedly connected to an inserted tip for easy insertion.

In a feasible design, the top of the connecting plate is provided with a third through hole penetrating therethrough, a top of the encapsulation tube is provided with a first through hole penetrating therethrough, and the first through hole, the second through hole and the third through hole are all adapted to the binding strip.

In a feasible design, a bottom of the connecting plate is fixedly connected to a labeling plate for attaching an article information label.

In this application, when people need to use labels, they first place the iron member into the encapsulation tube and then seal it through heat pressing. Next, they select a labeling plate of the corresponding size based on requirements and connect it to the connecting plate using a heat-pressing process. Then, they attach the article information label to the labeling plate. Finally, they wrap the binding strip around the article and secure it by sequentially passing the inserted tip through the third through hole, the second through hole and the first through hole.

In this disclosure, the composite label cleverly divides the functional area into two independent modules: a perforated fixing module and a labeling plate. This design allows labeling plates of different sizes to be freely combined with the perforated fixing module, greatly expanding the size options for a single label style. It achieves a flexible configuration of "one style, a plurality of sizes," meeting the market's diverse and personalized demands.

In this disclosure, the composite label simplifies the production process through modular design, avoiding the need for frequent custom molds or production line adjustments due to fixed size specifications for each style. Manufacturers can focus on producing standardized perforated fixing modules and then quickly assemble them into products of different specifications based on customer needs. This shortens the production cycle, reduces costs, and significantly improves efficiency.

In this disclosure, the composite label allows for colorful combinations through methods like color splicing, further satisfying consumers' personalized pursuit of product appearance. This flexible and versatile design makes the product more attractive in the market, helping to enhance brand image and market share.

In the present disclosure, labeling plates of different sizes can be freely combined with perforated fixing modules, greatly enriching the size selection range for a single label style, achieving a flexible configuration of "one style with a plurality of sizes," and meeting the diverse and personalized demands of the market. This simplifies the production and processing workflow, avoiding the need for frequent custom molds or production line adjustments due to fixed size specifications for each style. Manufacturers can focus on producing standardized perforated fixing modules and then quickly assemble them into products of different specifications based on customer requirements, thereby shortening the production cycle, reducing production costs, and significantly improving production efficiency. Additionally, colorful combinations can be achieved through methods like color splicing, further satisfying consumers' personalized pursuit of product appearance. This flexible and versatile design makes the product more attractive in the market, helping to enhance brand image and market share.

The beneficial effects of the present disclosure compared to the prior art are as follows:

Compared with the prior art, the composite label provided by the present disclosure separates the labeling plate from the interlocking fixing mechanism through modular design, enabling independent production and flexible matching of a plurality of sizes for both components. This effectively addresses the technical challenge of traditional one-piece labels being bound to specific styles and sizes. This design not only significantly reduces mold costs and inventory management difficulties for manufacturers but also improves production efficiency. Moreover, it allows a single label to adapt to packaging or products of various sizes, greatly enhancing the product's applicability and market competitiveness.

BRIEF DESCRIPTION OF DRAWINGS

The drawings, which form part of this application, are provided to further illustrate the present disclosure. The illustrative embodiments and the descriptions thereof are intended to explain the present disclosure and do not constitute an undue limitation thereof. In the drawings.

Figure 1:
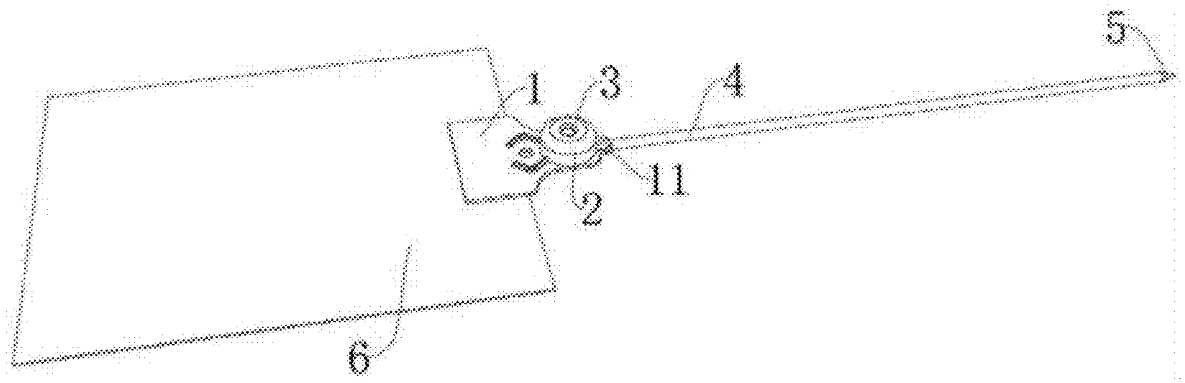
FIG. 1 is a perspective schematic view of an embodiment provided by the present disclosure.

Reference signs: Connecting plate (1); Encapsulation tube (2); First through hole (3); Binding strip (4); Inserted tip (5); Labeling plate (6); Iron member (7); Second through hole (8); Limiting block (9); Third through hole (10); Connecting block (11); Grommet button (12); Installation member (13); Installation base (14); Tapered engagement boss (15); Inclined plate (16); Channel (17); Gap (18); Reinforcing rib (19); Engagement block (20); Inclined surface (21); Abutting surface (22); Hidden snap assembly (23); Step groove (24); Claw (25); Snap fastener (26); Concave-convex platform (27); Fixture structure (28); Stop block (29); Serrated boss (30); Rolled strip (31); Locking structure (32); Wrench (33); Locking block (34); Protective cover (35); Locking post (36); Steel wire rope (37); Rivet button (38); Installation hole (39); Upper template (100); Lower template (200); Upper mold cavity (101); Lower mold cavity (201).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Referring to FIGS. 1-4, a label includes an interlocking fixing mechanism and a labeling plate 6. The interlocking fixing mechanism specifically includes a connecting plate 1, an encapsulation tube 2, a connecting block 11 and a binding strip 4. The whole is divided into two modules, each with independent structure and function, laying the foundation for flexible combinations. The two major modules can be independently designed in a plurality of size specifications, enabling diverse label styles through free combinations, with each style covering a plurality of size options to flexibly adapt to the application needs of different articles. Meanwhile, the modular design significantly simplifies processing logic, as the two modules support independent production. Iteration only requires adjusting the parameters of a single module—for example, changes to the production parameters of the labeling plate do not affect the fixing mechanism production line, effectively lowering the technical threshold for equipment and reducing material waste, thereby enhancing efficiency and cost control from the process side.

Figure 18:
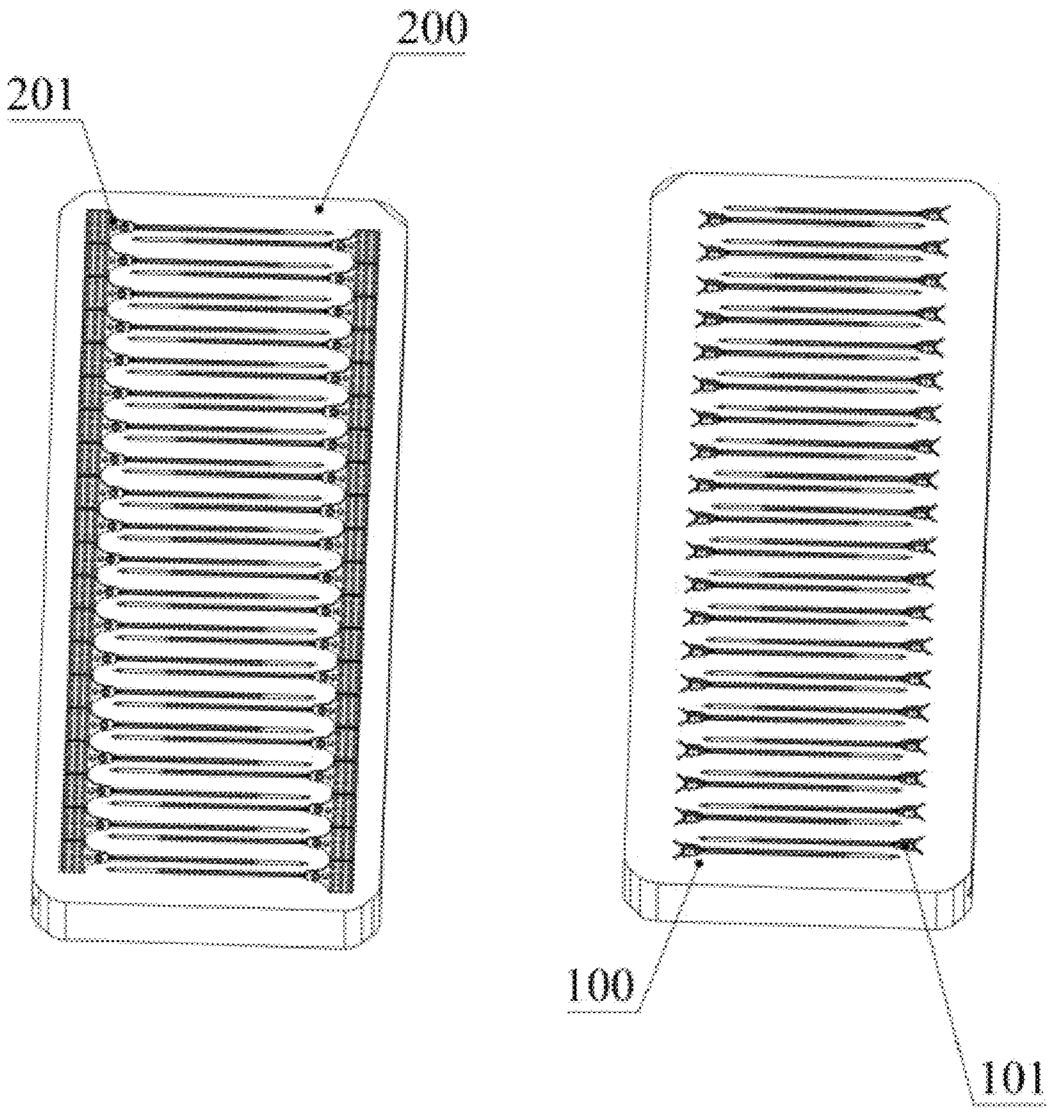
FIG. 18 is a structural schematic view of the plastic injection mold in the embodiment described in FIG. 1.

Specifically, as shown in FIG. 1, in this embodiment, the labeling plate 6 can be processed using stamping and cutting techniques, enabling efficient mass production directly. This not only significantly improves production efficiency but also greatly reduces unit manufacturing costs. The interlocking fixing mechanism, on the other hand, is produced using thermoplastic injection molding. Its matching plastic injection mold (see FIG. 18) includes an upper template 100 and a lower template 200, each correspondingly equipped with paired upper mold cavities 101 and lower mold cavities 201, providing the cavity foundation for the injection molding of the interlocking fixing mechanism. Due to its size and morphological characteristics, when the interlocking fixing mechanism is no longer integrated with the labeling plate 6 (i.e., designed independently of the labeling plate), the same injection mold can double the number of interlocking fixing mechanisms produced in a single run. This design comprehensively enhances the cost-effectiveness of the overall solution from the manufacturing side, further highlighting the technical and economic advantages.

As shown in FIG. 1, in this embodiment, the connecting plate 1 serves as the supporting structure for the entire label, with an encapsulation tube 2 fixedly connected to its top. The design of the encapsulation tube 2 is intended to accommodate and secure the subsequently mentioned iron member 7, ensuring stable engagement of the binding strip 4. Specifically, the encapsulation tube 2 can hold and fix the iron member 7 during subsequent assembly, providing reliable structural support for the engagement action of the binding strip 4 through stable positioning of the iron member 7. When the binding strip 4 is assembled by passing through the relevant through-holes as designed, the iron member 7, firmly secured by the encapsulation tube 2, can precisely align with the binding strip 4, forming a stable engagement relationship. This engagement structure effectively prevents the binding strip 4 from loosening or detaching during use, ultimately ensuring the label remains stably attached to the article and guaranteeing overall fixation effectiveness and usage reliability.

Figure 4:
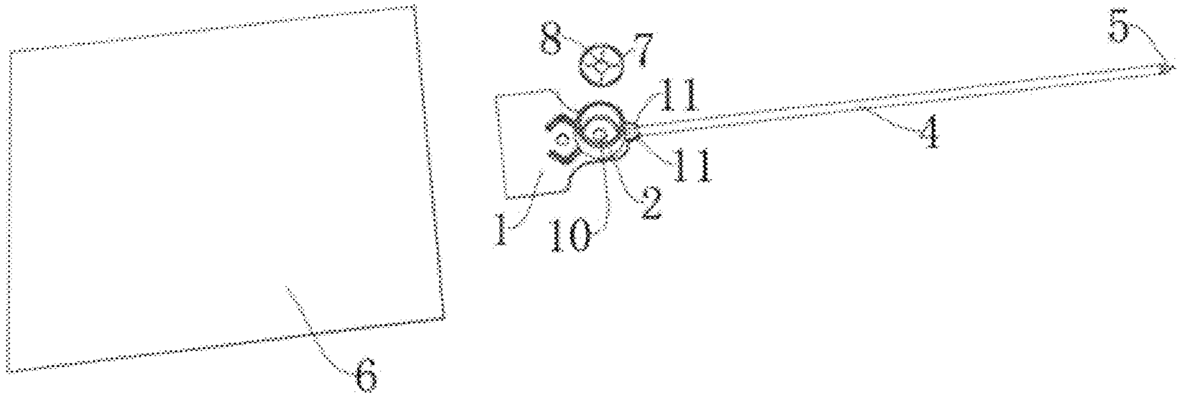
FIG. 4 is a structural schematic view of the third through hole in the embodiment shown in FIG. 3.

Specifically, referring to FIG. 4, in this embodiment, two symmetrically arranged connecting blocks 11 are fixedly connected to one side of the connecting plate 1. The symmetrical layout ensures more balanced force distribution on one end of the binding strip 4, avoiding issues such as tilting or deformation caused by single-end fixation, thereby maintaining the structural stability of the binding strip 4. The sides of these two connecting blocks 11 facing each other are fixedly connected to one end of the binding strip 4. Through this connection, the connecting blocks 11 act as bridging carriers, providing stable attachment support points for the binding strip 4, effectively preventing one end of the binding strip 4 from loosening from the connecting plate 1 and reinforcing the reliability of their connection. This ultimately ensures the binding strip 4 remains firmly attached to the connecting plate 1. The secure attachment of the binding strip 4 also lays a solid foundation for its subsequent passage through through-holes and engagement with the iron member 7, ensuring the overall fixation function of the label is successfully achieved.

Figure 5:
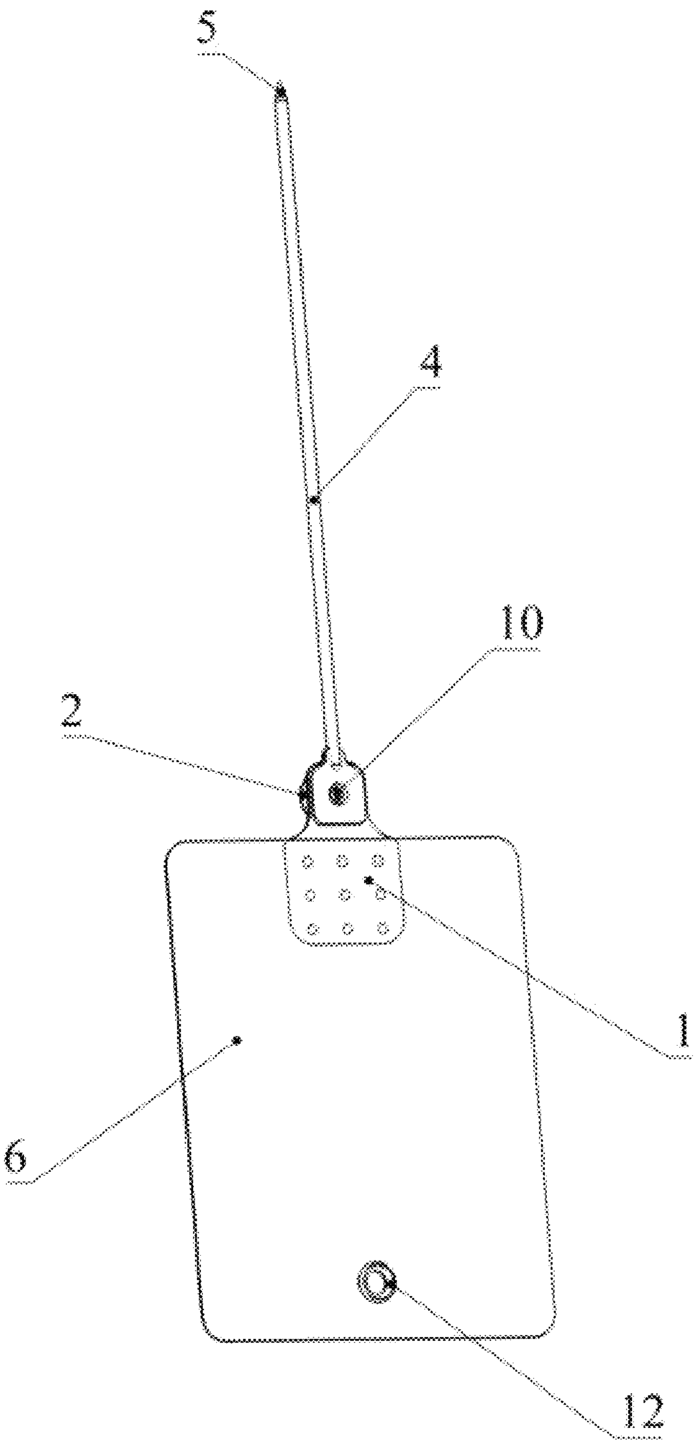
FIG. 5 is a structural schematic view of a grommet button solution in another embodiment of the present disclosure.

Specifically, referring to FIG. 5, in other embodiments, to further expand functionality, a grommet button 12 or a snap fastener structure (not shown) can be added to the end of the connecting plate 1 away from the binding strip 4. This design allows the label, in addition to its basic binding and fixation functions, to be directly hung on external supports such as hooks or tree branches via fasteners, significantly broadening the label's applicable scenarios. It effectively meets users' diverse hanging needs in different environments, greatly enhancing the product's functionality and practicality.

Specifically, the encapsulation tube 2 contains an iron member 7 inside, designed to form a snap-fit connection with the binding strip 4. This snap-fit connection provides critical securing support for attaching the label to the article, ensuring stable adhesion of the label to the article through the cooperation of the binding strip 4 and the iron member 7. The center of the top of the iron member 7 is provided with a second through hole 8 penetrating therethrough, allowing the binding strip 4 to pass through. This clears the path for precise snap-fit engagement between the binding strip 4 and the iron member 7, preventing misalignment due to the absence of a clear channel and ensuring smooth progression of the snap-fit process. Additionally, a plurality of limiting blocks 9 are fixed to the circumferential outer wall of the iron member 7 to prevent its movement within the encapsulation tube 2, thereby stabilizing the snap-fit connection. By restricting displacement of the iron member 7, the limiting blocks 9 avoid loosening of the snap-fit position of the iron member 7 caused by external forces (e.g., pulling or vibration), further reinforcing the reliability of the snap-fit connection and ensuring the label's securing function remains effective.

Figure 3:
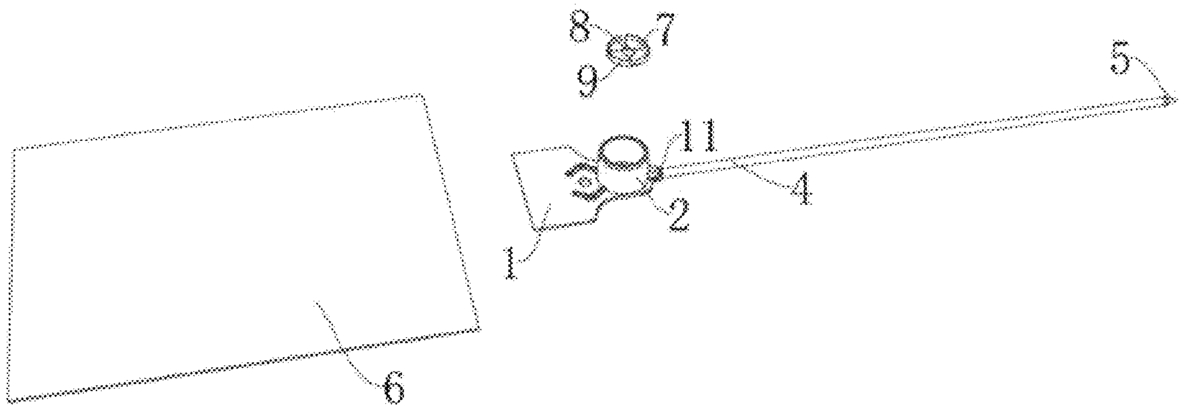
FIG. 3 is an exploded schematic view of the embodiment shown in FIG. 1.

As shown in FIG. 3, the top of the connecting plate 1 is provided with a third through hole 10 penetrating therethrough, providing a precise channel for the binding strip 4 to pass through from the connecting plate 1 end. This ensures the binding strip 4 can smoothly interface with components inside the encapsulation tube 2. Meanwhile, the top of the encapsulation tube 2 is provided with a first through hole 3 penetrating therethrough to receive the externally inserted binding strip 4, guiding it steadily into the encapsulation tube 2 and laying the groundwork for subsequent engagement with the iron member 7. These two through holes, together with the second through hole 8 on the iron member 7, form a path for the binding strip 4 to pass through. The design of three aligned and coherent channels prevents deviation or jamming of the binding strip 4 during insertion, ensuring it passes smoothly through the entire label structure while also fixing the insertion trajectory of the binding strip 4 for precise positioning in subsequent snap-fit steps. Ultimately, this ensures the binding strip 4 is securely fixed to the label, further guaranteeing reliable attachment of the label to the article through the binding strip 4.

Figure 2:
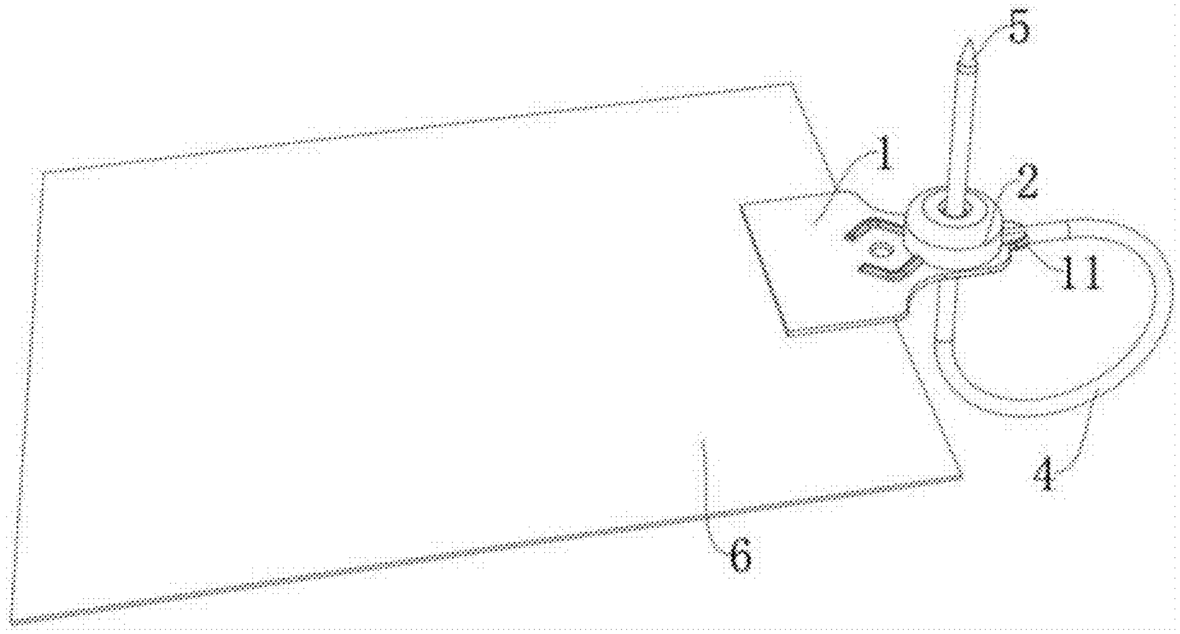
FIG. 2 is a structural schematic view of the binding strip and connecting plate after installation and fixation in the embodiment of FIG. 1.

As shown in FIGS. 1 and 2, in this embodiment, the bottom of the connecting plate 1 is fixedly connected to a labeling plate 6, which is used for attaching the article information label. The bottom of the connecting plate 1 forms a fixed connection with the labeling plate 6, whose primary role is to carry the article information label. This structural design allows clear recording of key article details such as specifications, model, and batch, facilitating quick reading by staff to avoid information confusion while also providing accurate data for subsequent article traceability and classification management. Thus, the composite label can deliver higher practical efficiency in article identification and management scenarios.

With the continuous improvement in people's living standards, the requirements for product appearance have also increased when purchasing or using articles. Aesthetically pleasing products can more accurately meet the current consumers' aesthetic needs, thereby gaining a more prominent competitive edge in the market. This advantage not only actively attracts consumers' attention but also makes the product more favorable compared to competing alternatives, ultimately helping the product secure a more advantageous position in the market.

Figure 6:
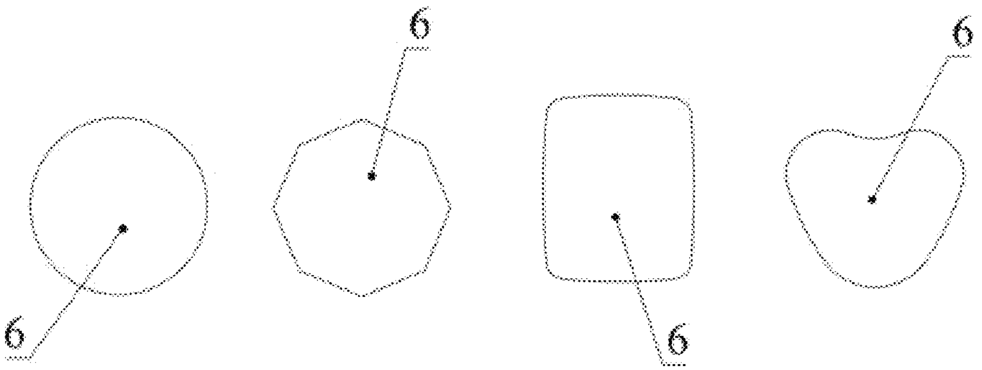
FIG. 6 is a connection schematic view of an alternative labeling plate in the embodiment shown in FIG. 1.

As shown in FIG. 6, based on this market demand and product design logic, in other embodiments of the present disclosure, merchants can DIY the shape of the labeling plate 6, specifically designing it into various forms such as heart-shaped, regular octagonal, or circular. This enhances the overall aesthetic appeal of the composite label through the personalized appearance design of the labeling plate 6, better aligning with consumers' diverse expectations for product appearance.

Specifically, referring to FIG. 2, in this embodiment, the connecting plate 1 and the labeling plate 6 are fixedly connected via ultrasonic welding. This welding method not only forms a high-strength integrated structure, effectively preventing separation or loosening during use and ensuring the overall structural stability of the label, but also provides a smooth and even surface for providing a good base for attaching the article information label to the labeling plate 6. This enhances the adhesion strength of the label while maintaining a neat appearance, thereby reinforcing the dual reliability of the composite label in structural support and information identification.

Figure 7:
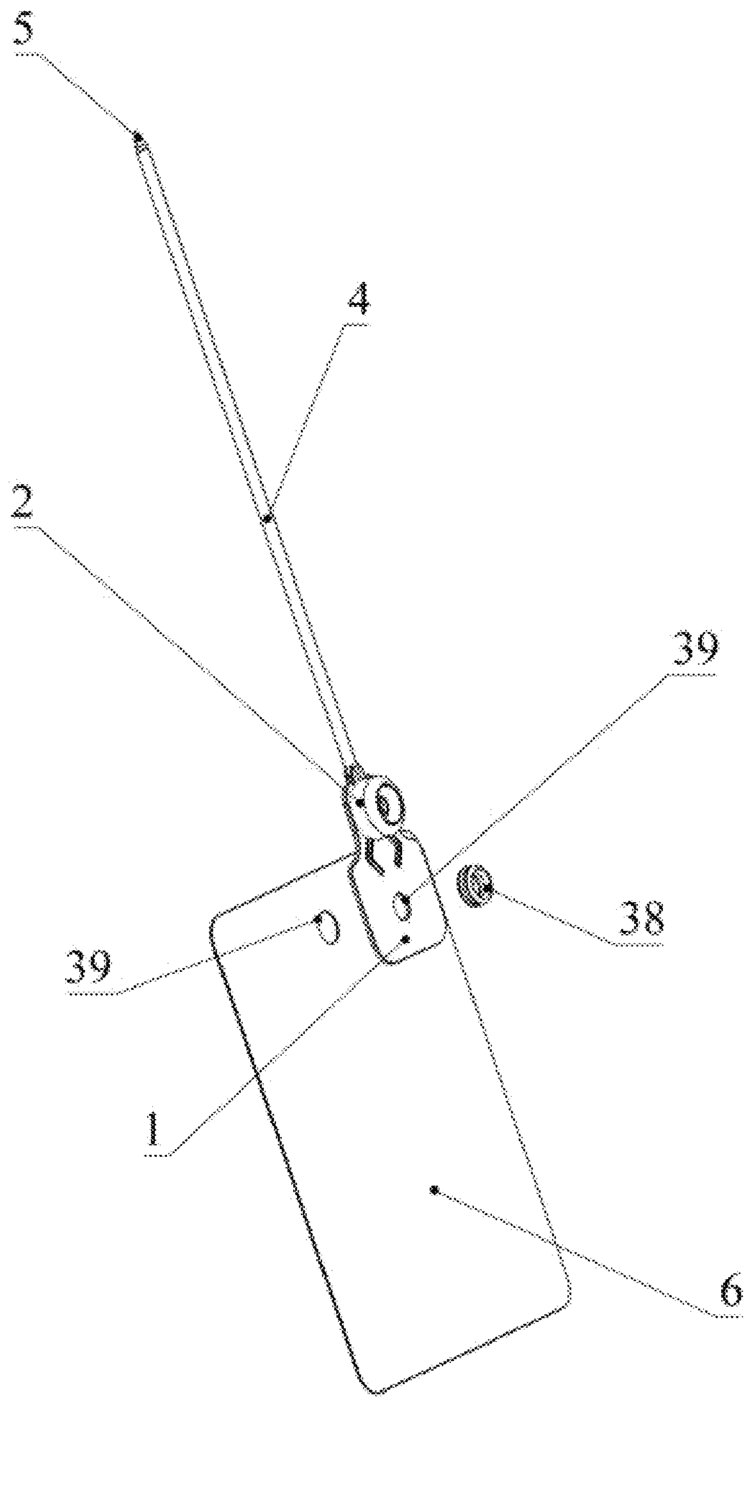
FIG. 7 is a connection schematic view of the connecting plate and labeling plate in another embodiment of the present disclosure.

Referring to FIG. 7, in other embodiments, besides ultrasonic welding, the connecting plate 1 and the labeling plate 6 can also be fixedly connected by adding additional connection structures. Specifically, rivet buttons are added, with corresponding installation holes 8 drilled on both the connecting plate 1 and the labeling plate 6, allowing the rivet button 38 to pass through the installation hole 39, thereby achieving mechanical fixation of the two. This design not only provides an alternative solution for connection between the connecting plate 1 and the labeling plate 6 to adapt to scenarios where ultrasonic welding cannot meet use requirements—such as for brittle materials or applications sensitive to welding heat—but also enhances the connection strength through mechanical riveting, effectively resisting external forces like pulling or vibration during use, thereby improving the durability and adaptability of the composite label's overall structure.

Referring to FIGS. 1-4, based on Embodiment 1, an improvement is made: a composite label applied in the labeling field. One end of the binding strip 4 is designed with an inserted tip 5, allowing the binding strip 4 to be easily inserted into and pass through the third through hole 10, the second through hole 8 and the first through hole 3. The inserted tip 5 reduces contact resistance between the binding strip 4 and the inner walls of the through holes during insertion, preventing jamming caused by flat ends and ensuring that the binding strip 4 can smoothly passthrough the continuous through-hole path. This design enhances convenience and efficiency in use.

Figure 8:
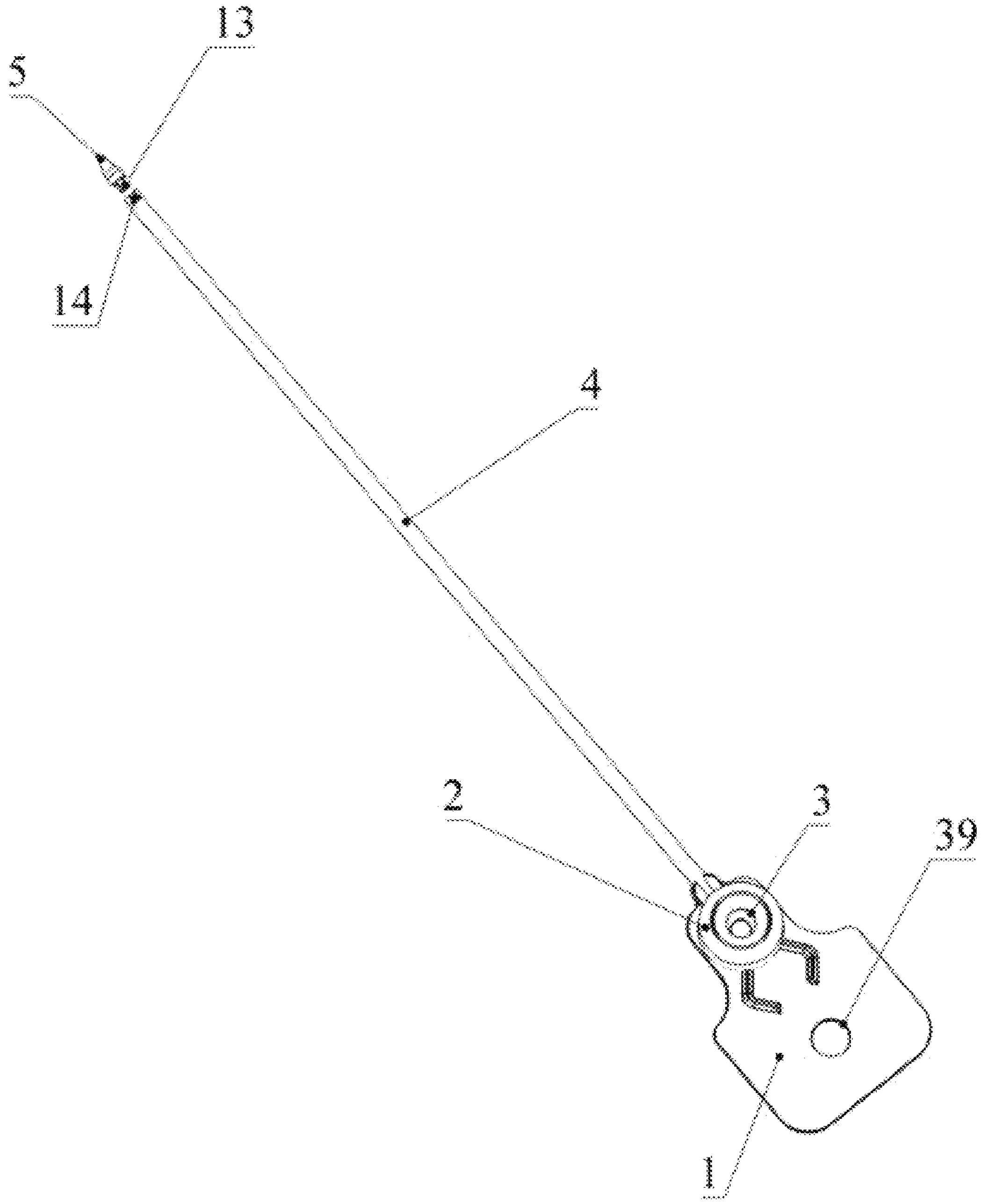
FIG. 8 is a structural schematic view of a metal inserted tip solution in another embodiment of the present disclosure.

Specifically, as shown in FIG. 8, in other embodiments, to improve the insertion efficiency of the inserted tip 5, a "separate production+matched assembly" design can be adopted: the inserted tip 5 and binding strip 4 are manufactured separately, with the inserted tip 5 made of metal to enhance its penetration performance. The assembly structure is as follows: the inserted tip 5 is pre-equipped with an installation member 13, while the end of the binding strip 4 away from the labeling plate 6 is correspondingly fitted with an installation base 14 compatible with the installation member 13; after the installation member 13 is embedded into the installation base 14, fixation is completed through the ultrasonic hot pressing sealing process, ensuring a stable connection. With this approach, the metal inserted tip 5 offers greater hardness and penetration capability, easily piercing through various materials such as bags, cartons, and fabric. Compared to the traditional one-piece inserted tip 5, this effectively avoids penetration failures with hard materials due to material or structural limitations, significantly improving smoothness and efficiency in practical operations.

Figure 9:
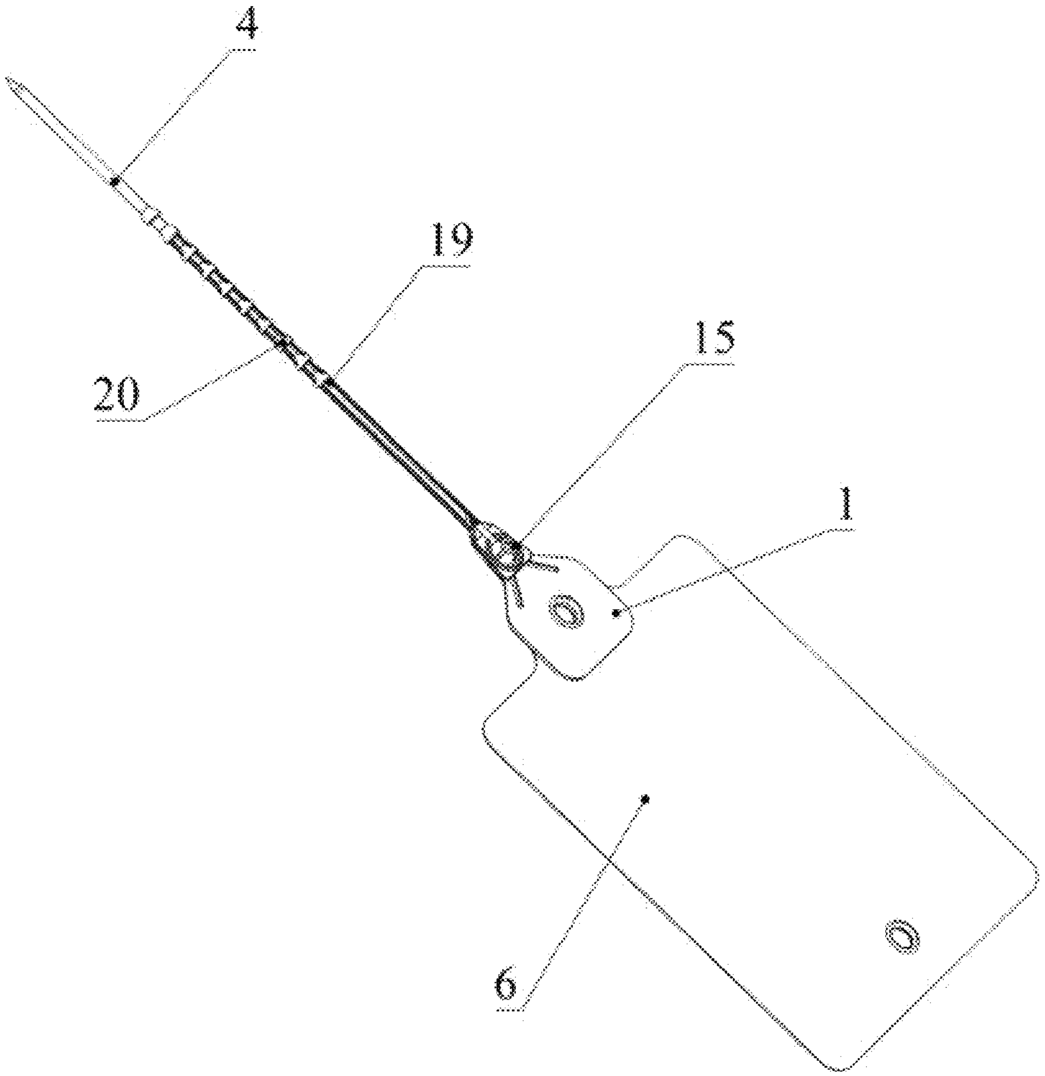
FIG. 9 is a structural schematic view of a tapered engagement boss solution in another embodiment of the present disclosure.
Figure 10:
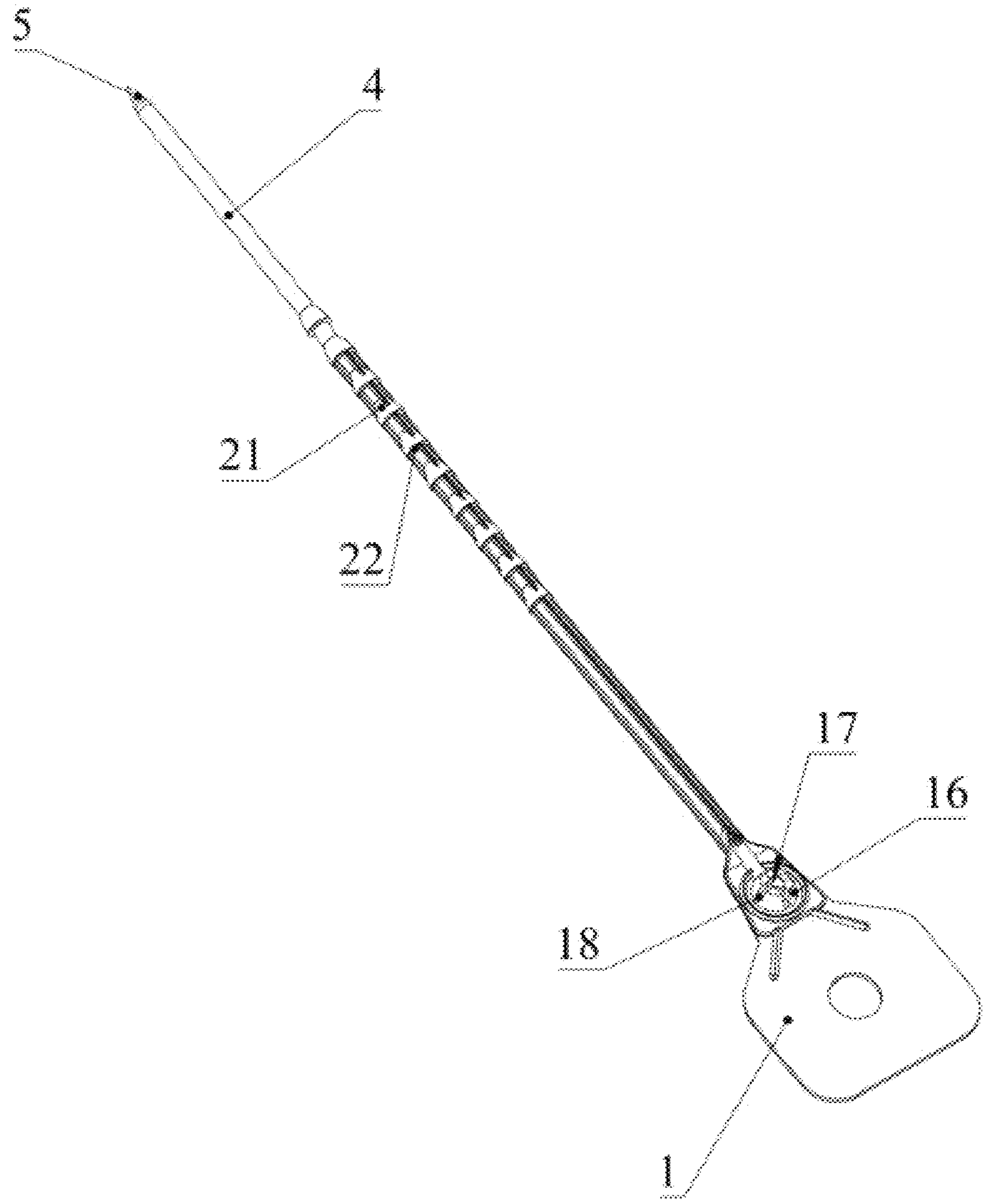
FIG. 10 is a structural schematic view of the inclined plate in the embodiment shown in FIG. 9.

As shown in FIGS. 9 and 10, in other embodiments of the present disclosure, the iron member 7 and encapsulation tube 2 can be omitted and replaced by a tapered engagement boss 15 on the connecting plate 1. The tapered engagement boss 15 consists of four inclined plates 16 with certain elasticity. The inclined plates 16 extend upward from the connecting plate 1 and are enclosed to form a channel 17 for the binding strip 4 to pass through, with gaps 18 between adjacent inclined plates 16. This structural design ensures smooth passage of the binding strip 4 while providing necessary deformation space for the inclined plates 16, achieving reliable fixation of the binding strip through elastic engagement.

Specifically, referring to FIG. 10, the connecting plate 1 includes a binding strip 4. The binding strip 4 is additionally equipped with a plurality of reinforcing ribs 19 and engagement blocks 20. The reinforcing ribs 19 not only significantly enhance the structural stability of the engagement blocks 20 but also, after the binding strip passes through the channel 17 of the tapered engagement boss 15, form a complementary fit with the gap 18 between adjacent inclined plates 16, thereby effectively improving the connection stability between the binding strip 4 and the tapered engagement boss 15. The engagement blocks 20 are designed with an inclined surface 21 at a specific angle and a flat abutting surface 22. The structure of the inclined surface 21 facilitates the smooth insertion and passage of the binding strip through the channel 17. After the binding strip passes through the channel 17, each inclined plate 16 moves inward under elastic force and tightly abuts the abutting surface 22 of the engagement block 20, forming a reliable lock between the binding strip 4 and the connecting plate 1.

Figure 11:
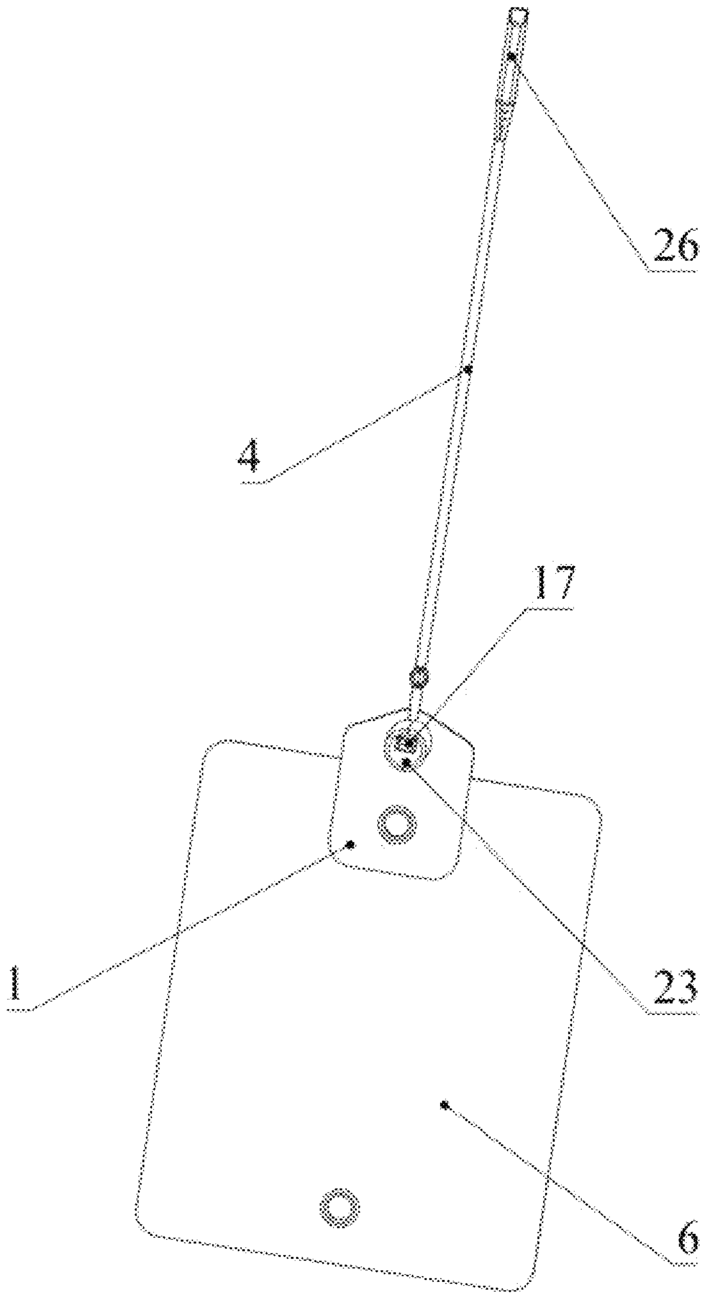
FIG. 11 is a structural schematic view of a hidden snap assembly in another embodiment of the present disclosure.
Figure 12:
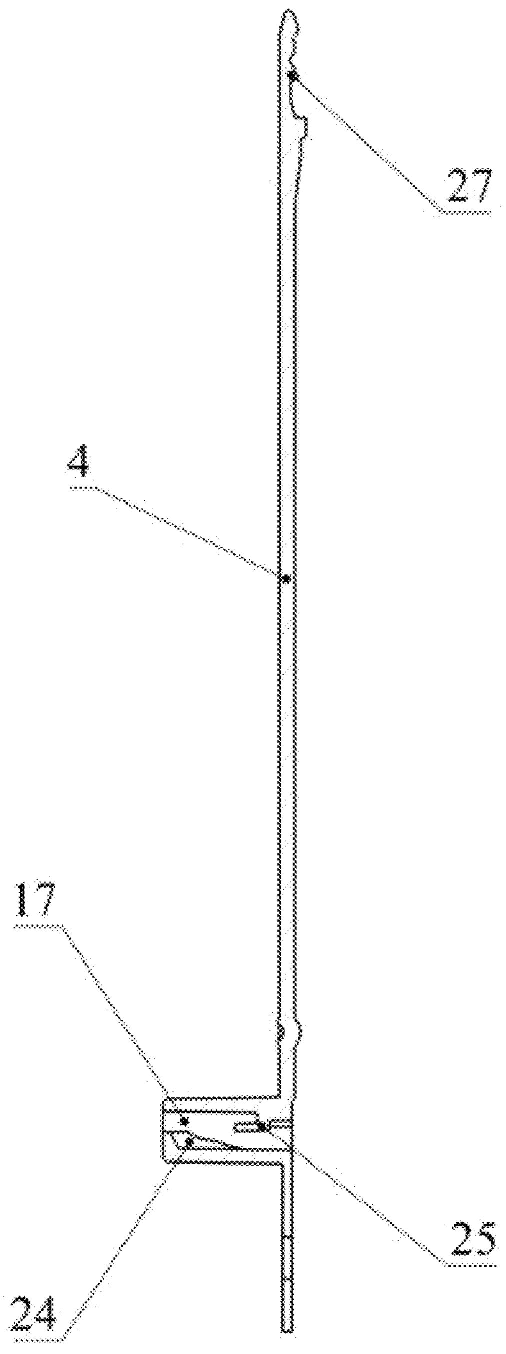
FIG. 12 is a cross-sectional view of the step groove and claw in the embodiment shown in FIG. 11.

As shown in FIGS. 11 and 12, in other embodiments of the present disclosure, the connecting block 11 can also be configured to the same specifications as the connecting plate 1, with the connecting block 11 extending upward from the top of the connecting plate 1 to the binding strip 4. By replacing the iron member 7 and encapsulation tube 2 with a hidden snap assembly 23 on the connecting plate 1, a step groove 24 is formed inside the hidden snap assembly 23, within which a channel 17 is created, and a claw 25 is arranged in the step groove 24. The inserted tip 5 is replaced by a snap fastener 26, which features an axial concave-convex platform 27. When the snap fastener 26 is inserted, the claw 25 is pushed open along the inclined surface by the snap fastener 26; when pulled in the opposite direction, the vertical surface of the claw 25 fits snugly against the snap fastener 26, achieving limiting and locking. The hidden snap assembly 23 and snap fastener 26 work together to enable tool-free quick connection while transmitting tension through contact surfaces, ensuring connection strength and adapting to multi-scenario tension requirements.

Figure 13:
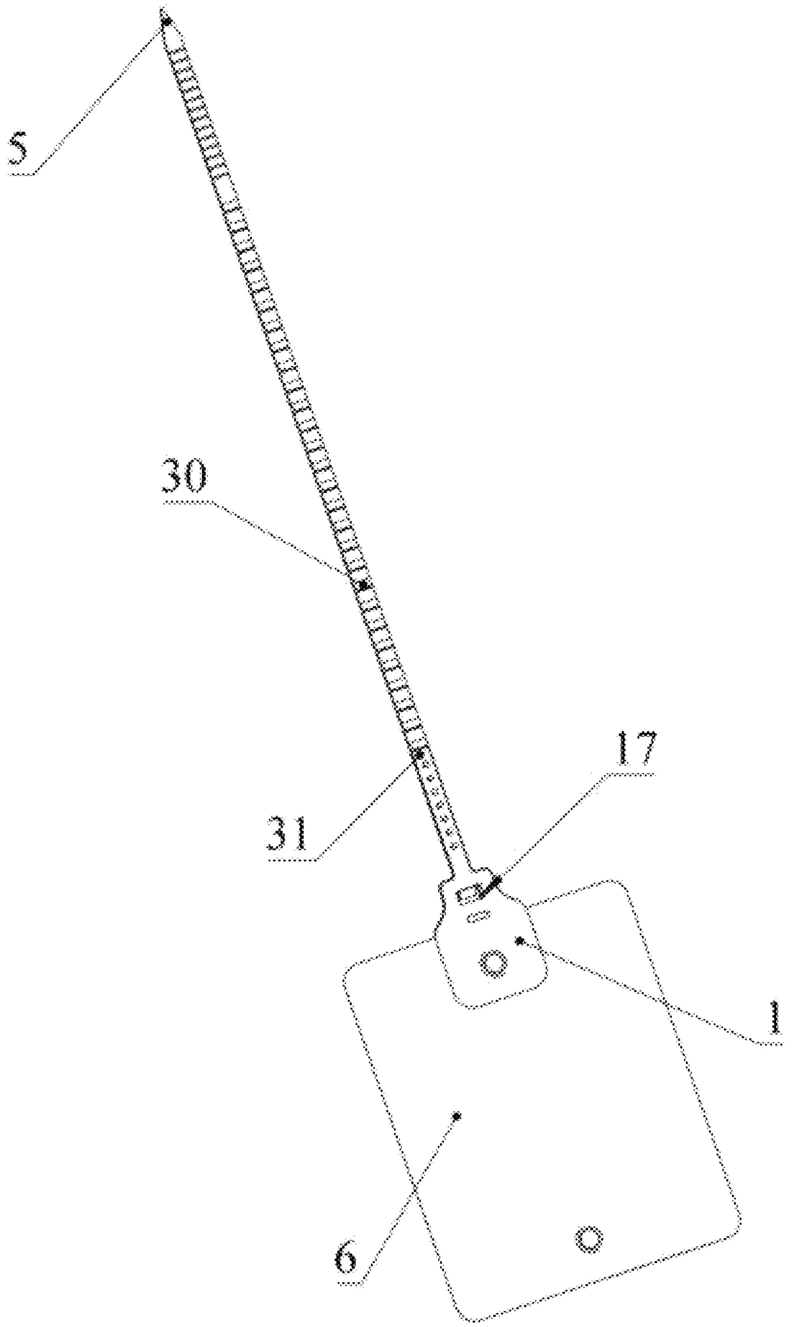
FIG. 13 is a structural schematic view of the rolled strip solution in other embodiments of the present disclosure.
Figure 14:
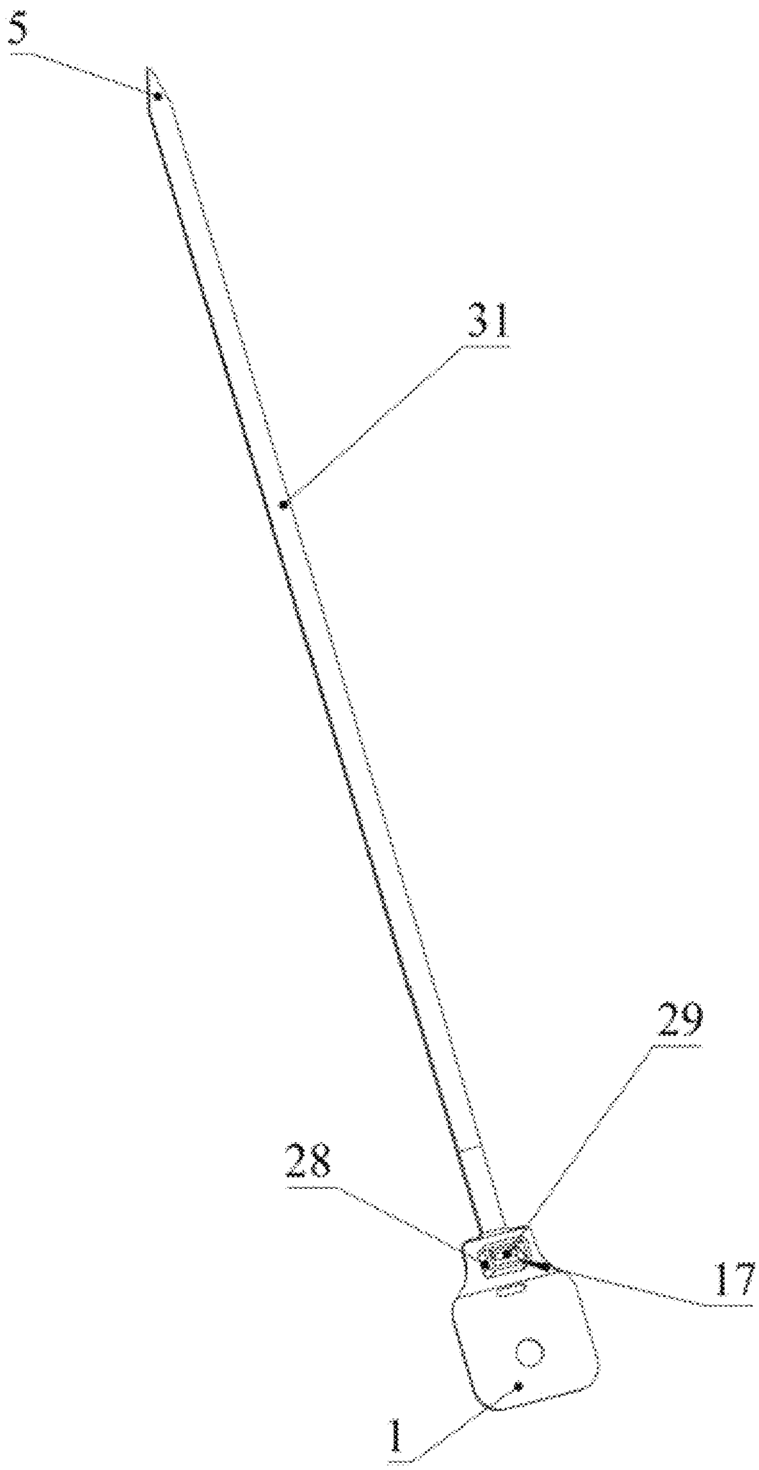
FIG. 14 is a structural schematic view of the fixture structure in the embodiment shown in FIG. 13.

As shown in FIGS. 13 and 14, in other embodiments of the present disclosure, the iron member 7 and encapsulation tube 2 can also be replaced by installing a fixture structure 28 on the connecting plate 1. A channel 17 is formed inside the fixture structure 28, and a stop block 29 is arranged within the channel 17. Meanwhile, the binding strip 4 is replaced with a rolled strip 31 featuring serrated bosses 30. Specifically, during installation, the rolled strip 31 is inserted into the channel 17 of the fixture structure 28, and the serrated bosses 30 on the rolled strip interlock with the stop block inside the channel 17, forming a mechanical interlock to achieve a reliable locking function.

Figure 15:
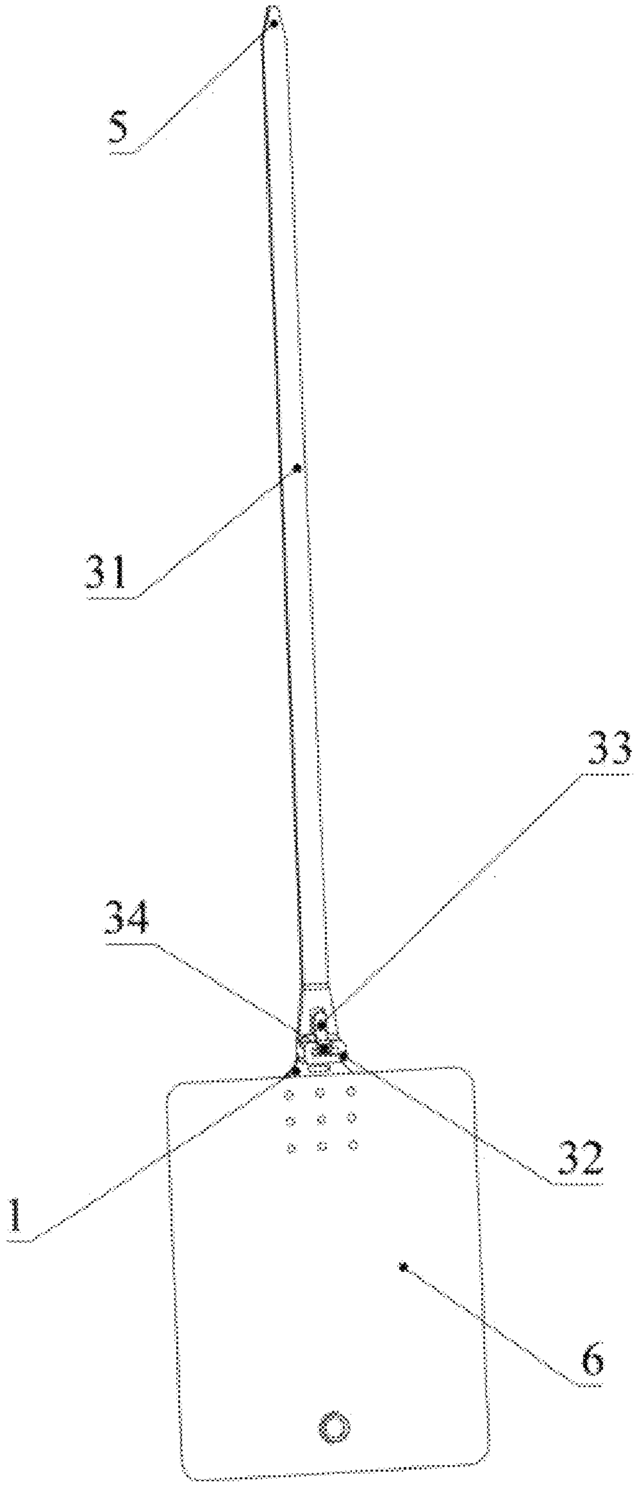
FIG. 15 is a structural schematic view of the locking structure solution in other embodiments of the present disclosure.
Figure 16:
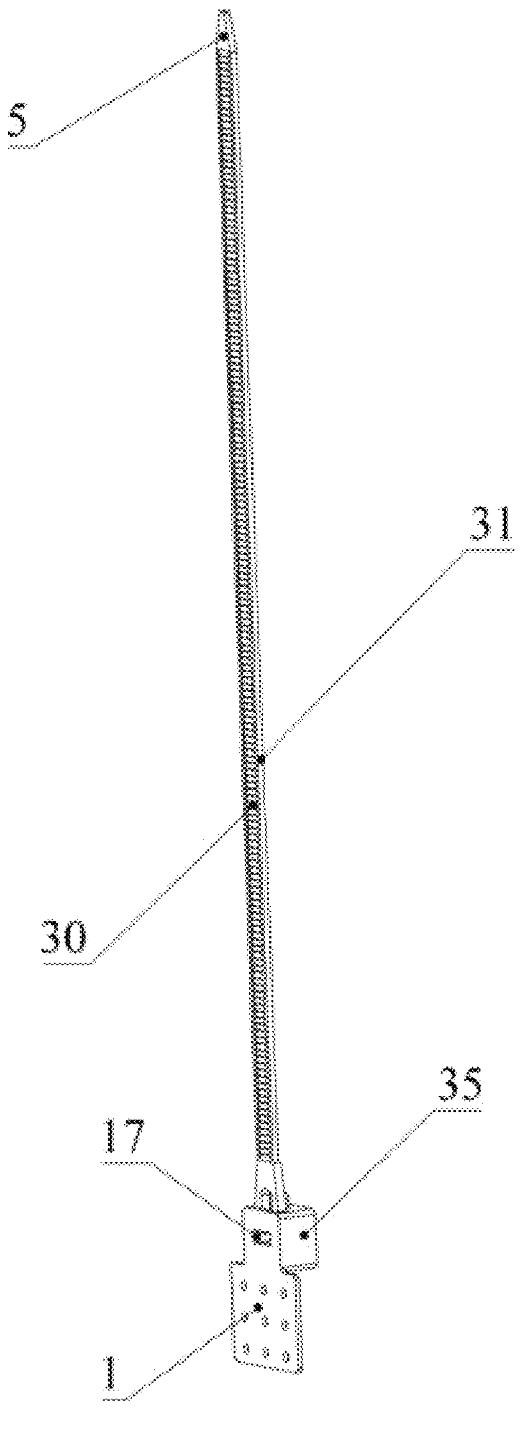
FIG. 16 is a structural schematic view of the protective cover in the embodiment shown in FIG. 15.

As shown in FIGS. 15 and 16, in other embodiments of the present disclosure, the iron member 7 and encapsulation tube 2 may also be replaced by providing a locking structure 32 on the connecting plate. This locking structure 32 internally forms a channel 17 and is equipped with a locking block 34 featuring a wrench 33. Actuating the wrench 33 drives the locking block 34 to move vertically. Correspondingly, the binding strip 4 is replaced with a rolled strip 31 featuring serrated bosses 30. Specifically, during installation, the rolled strip 31 can be inserted into the channel 17, achieving mechanical locking through the engagement of the serrated bosses 30 with the locking block 34. To unlock, it imply needs to actuate the wrench 33 to lift the locking block 34, thereby releasing the constraint on the rolled strip 31 and completing the unlocking operation. By incorporating the vertically movable locking block 34 with the wrench 33 and pairing it with the rolled strip 31, reversible locking and quick release of the label are achieved. This retains modular advantages while endowing the product with reusability and operational convenience, significantly expanding its application scenarios. In other embodiments, a protective cover 35 may be installed outside the locking structure 32. The protective cover 35 not only provides physical protection for the internal locking mechanism, preventing accidental external triggering or damage, but also conceals the unlocking structure within the cover, maintaining the label's appearance as unified and intact. This enhances both product safety and overall aesthetics.

Figure 17:
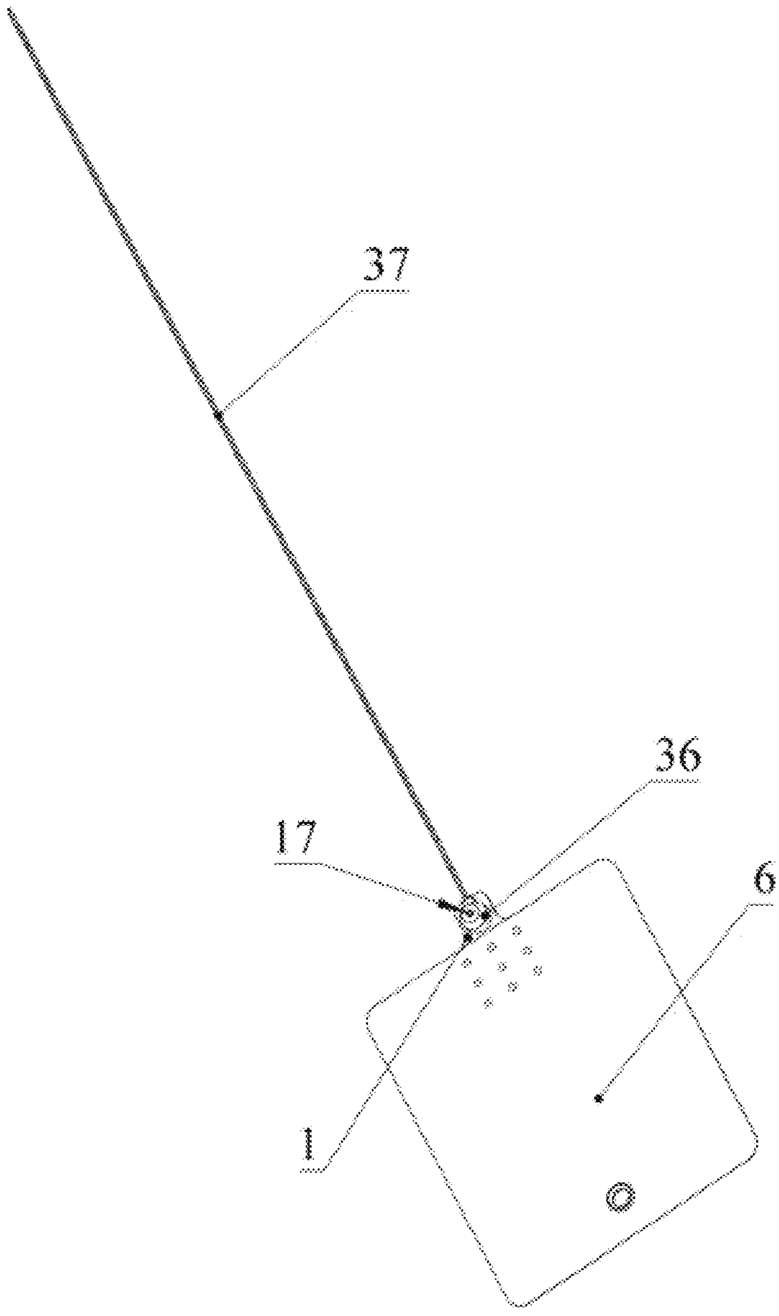
FIG. 17 is a structural schematic view of the steel wire rope solution in other embodiments of the present disclosure.

Referring to FIG. 17, in other embodiments of the present disclosure, the iron member 7 and encapsulation tube 2 may also be replaced by providing a locking post 36 on the connecting plate. The locking post 36 forms a channel 17, and the binding strip 4 is replaced with a steel wire rope 37. The steel wire rope 37 can pass through the channel 17 to form a lock with the locking post 36. This design leverages the high strength and corrosion resistance of the steel wire rope 37, enabling the label to adapt to high-intensity application scenarios such as ships and heavy equipment. At the same time, it simplifies the locking structure 32, improving environmental adaptability and service life.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A composite label, comprising:

an interlocking fixing mechanism, comprising a connecting plate, wherein a top of the connecting plate is fixedly connected to an encapsulation tube, one side of the connecting plate is fixedly connected to two connecting blocks, and sides of the two connecting blocks facing each other are fixedly connected to a binding strip.

2. The composite label according to claim 1, wherein the encapsulation tube is internally provided with an iron member for engaging the binding strip.

3. The composite label according to claim 2, wherein the center of a top of the iron member is provided with a second through hole penetrating therethrough, and a circumferential outer wall of the iron member is fixedly connected to a plurality of limiting blocks to prevent the iron member from moving.

4. The composite label according to claim 1, wherein one end of the binding strip is fixedly connected to an inserted tip for easy insertion.

5. The composite label according to claim 1, wherein the top of the connecting plate is provided with a third through hole penetrating therethrough, a top of the encapsulation tube is provided with a first through hole penetrating therethrough, and the first through hole, the second through hole and the third through hole are all adapted to the binding strip.

6. The composite label according to claim 1, wherein a bottom of the connecting plate is fixedly connected to a labeling plate for attaching an article information label.

7. A composite label, comprising a labeling plate and a connecting plate, wherein:

the labeling plate is provided with a connection structure, and the labeling plate is fixedly connected to the connecting plate through the connection structure; and the connecting plate has an encapsulation tube at a top thereof, and one side of the connecting plate is fixedly connected with a connecting block; and the encapsulation tube is internally provided with an iron member inside; and the connecting block is fixedly connected with a binding strip, and the binding strip has a free end;

wherein the free end of the binding strip is configured to form a snap connection with the iron member.

8. The composite label according to claim 7, wherein a top of the encapsulation tube is provided with a first through hole penetrating therethrough, the center of the top of the iron member is provided with a second through hole penetrating therethrough, and the top of the connecting plate is provided with a third through hole penetrating therethrough; the third through hole, the second through hole and the first through hole together form a penetration path for the binding strip to pass through, and the free end of the binding strip is configured to sequentially pass through the third through hole, the second through hole and the first through hole before forming the snap connection with the iron member.

9. The composite label according to claim 7, wherein an end of the binding strip away from the labeling plate is provided with a metal inserted tip.

10. The composite label according to claim 9, wherein the inserted tip is provided with an installation member, and the end of the binding strip away from the labeling plate is provided with an installation base adapted to the installation member.

11. The composite label according to claim 10, wherein after the installation member is embedded into the installation base, fixation is completed through an ultrasonic hot pressing sealing process to ensure a stable connection between the two.

* * * * *